United States Patent [19]
Payton

[11] Patent Number: 5,831,662
[45] Date of Patent: Nov. 3, 1998

[54] NEAR ON-DEMAND DIGITAL INFORMATION DELIVERY SYSTEM AND METHOD USING SIGNAL FRAGMENTATION AND SEQUENCING TO REDUCE AVERAGE BANDWIDTH AND PEAK BANDWIDTH VARIABILITY

[75] Inventor: David W. Payton, Woodland Hills, Calif.

[73] Assignee: Hughes Electronics Corporation, El Segundo, Calif.

[21] Appl. No.: 627,627

[22] Filed: Apr. 4, 1996

[51] Int. Cl.⁶ .............................. H04N 7/173; H04N 7/16
[52] U.S. Cl. .................................. 348/7; 348/12; 455/4.2
[58] Field of Search .................................. 348/7, 12, 13, 348/718; 395/200.49, 200.61; 455/4.2, 5.1, 6.1; H04N 7/173, 7/16

[56] References Cited

U.S. PATENT DOCUMENTS

| | | | |
|---|---|---|---|
| 5,168,353 | 12/1992 | Walker et al. | 455/5.1 |
| 5,357,276 | 10/1994 | Banker et al. | 348/7 |
| 5,414,455 | 5/1995 | Hooper et al. | 348/7 |
| 5,421,031 | 5/1995 | De Bey . | |
| 5,440,334 | 8/1995 | Walters et al. | 348/7 |
| 5,446,490 | 8/1995 | Blahut et al. | 348/7 |
| 5,477,263 | 12/1995 | O'Callaghan et al. | 348/7 |
| 5,506,615 | 4/1996 | Awaji | 348/7 |
| 5,543,861 | 8/1996 | Harradine et al. | 348/718 |
| 5,546,118 | 8/1996 | Ido | 348/7 |

*Primary Examiner*—Brian Casler
*Assistant Examiner*—Luanne P. Din
*Attorney, Agent, or Firm*—V. D. Duraiswamy; W. K. Denson-Low

[57] ABSTRACT

Near on-demand delivery of digital signals is accomplished by first dividing the signals into sequences of N numbered fragments, where the length of each fragment is equal to the broadcast time interval. The fragments are broadcast so that the first fragment is repeated every broadcast time interval, the second fragment is repeated every two time intervals, and so forth until the Nth fragment is repeated at least every Nth time interval. A fractal channel packing algorithm is preferably used to sequence the fragments over a plurality of channels to reduce the variability in peak bandwidth caused by fragmentation. The fragments are locally downloaded and stored during successive time intervals in response to a subscriber's request so that the first fragment is available within one time interval from the request, and the higher numbered fragments are available within their respective periods. The fragments are read out in order and integrated to seamlessly deliver the requested signal. As a result, the average bandwidth of the delivered signal increases only logarithmically, instead of linearly, as the broadcast time interval is reduced. If a portion of the delivered signal is pre-stored at the receiving site, the required broadcast bandwidth has a finite bound, regardless of how much the broadcast time interval is reduced.

33 Claims, 8 Drawing Sheets

| Segment Num | Period | Offset |
|---|---|---|
| 1 | 1 | 0 |
| 2 | 2 | 0 |
| 3 | 3 | 0 |
| 4 | 4 | 1 |
| 5 | 5 | 0 |
| 6 | 6 | 1 |
| 7 | 7 | 0 |
| 8 | 8 | 3 |
| 9 | 9 | 2 |
| 10 | 10 | 1 |
| 11 | 10 | 6 |
| 12 | 12 | 4 |
| 13 | 12 | 10 |
| 14 | 14 | 1 |
| 15 | 15 | 2 |
| 16 | 16 | 7 |
| 17 | 16 | 15 |
| 18 | 18 | 5 |
| 19 | 18 | 14 |
| 20 | 20 | 3 |
| 21 | 21 | 2 |
| 22 | 21 | 9 |
| 23 | 21 | 16 |
| 24 | 21 | 3 |
| 25 | 25 | 4 |
| 26 | 25 | 9 |
| 27 | 27 | 8 |
| 28 | 28 | 8 |
| 29 | 28 | 22 |
| 30 | 30 | 7 |
| 31 | 30 | 22 |
| 32 | 30 | 12 |
| 33 | 30 | 27 |
| 34 | 30 | 8 |
| 35 | 35 | 4 |
| 36 | 35 | 11 |
| 37 | 35 | 18 |
| 38 | 35 | 25 |
| 39 | 35 | 32 |
| 40 | 40 | 13 |
| 41 | 40 | 33 |
| 42 | 42 | 10 |
| 43 | 42 | 31 |
| 44 | 42 | 17 |
| 45 | 42 | 38 |
| 46 | 42 | 5 |
| 47 | 42 | 19 |
| 48 | 42 | 33 |
| 49 | 49 | 6 |
| 50 | 50 | 14 |
| 51 | 50 | 39 |
| 52 | 50 | 19 |
| 53 | 50 | 44 |
| 54 | 54 | 17 |
| 55 | 54 | 44 |
| 56 | 56 | 12 |
| 57 | 56 | 40 |
| 58 | 56 | 26 |
| 59 | 56 | 54 |
| 60 | 60 | 18 |
| 61 | 60 | 48 |
| 62 | 60 | 28 |
| 63 | 60 | 58 |
| 64 | 54 | 26 |
| 65 | 54 | 53 |
| 66 | 50 | 24 |
| 67 | 50 | 49 |
| 68 | 49 | 13 |
| 69 | 49 | 20 |
| 70 | 49 | 27 |
| 71 | 49 | 34 |
| 72 | 49 | 41 |
| 73 | 49 | 48 |

| Segment Num | Period | Offset |
|---|---|---|
| 11 | 10 | 0 |
| 12 | 12 | 0 |
| 13 | 12 | 6 |
| 14 | 14 | 1 |
| 15 | 15 | 1 |
| 16 | 15 | 4 |
| 17 | 15 | 7 |
| 18 | 18 | 3 |
| 19 | 18 | 9 |
| 20 | 20 | 2 |
| 21 | 21 | 2 |
| 22 | 21 | 5 |
| 23 | 21 | 8 |
| 24 | 21 | 11 |
| 25 | 21 | 14 |
| 26 | 21 | 17 |
| 27 | 21 | 20 |
| 28 | 28 | 3 |
| 29 | 28 | 17 |
| 30 | 30 | 10 |
| 31 | 30 | 25 |
| 32 | 30 | 13 |
| 33 | 30 | 28 |
| 34 | 30 | 4 |
| 35 | 30 | 14 |
| 36 | 36 | 15 |
| 37 | 36 | 33 |
| 38 | 30 | 24 |
| 39 | 30 | 6 |
| 40 | 40 | 12 |
| 41 | 40 | 32 |
| 42 | 42 | 5 |
| 43 | 42 | 19 |
| 44 | 42 | 33 |
| 45 | 42 | 7 |
| 46 | 42 | 21 |
| 47 | 42 | 35 |
| 48 | 42 | 9 |
| 49 | 42 | 23 |
| 50 | 50 | 8 |
| 51 | 50 | 18 |
| 52 | 50 | 28 |
| 53 | 50 | 38 |
| 54 | 50 | 48 |
| 55 | 42 | 37 |
| 56 | 56 | 11 |
| 57 | 56 | 39 |
| 58 | 56 | 25 |
| 59 | 56 | 53 |
| 60 | 60 | 16 |
| 61 | 60 | 46 |
| 62 | 60 | 26 |
| 63 | 60 | 56 |
| 64 | 56 | 13 |
| 65 | 56 | 41 |
| 66 | 56 | 27 |
| 67 | 56 | 55 |

NEAR ON-DEMAND DIGITAL INFORMATION DELIVERY SYSTEM AND METHOD USING SIGNAL FRAGMENTATION AND SEQUENCING TO REDUCE AVERAGE BANDWIDTH AND PEAK BANDWIDTH VARIABILITY

BACKGROUND OF THE INVENTION

1. Field of the Invention

This invention relates to near on-demand broadcasting of digital information to local subscribers and more specifically to a near on-demand delivery system and method that broadcasts signal fragments according to a sequencing pattern to reduce average bandwidth and peak bandwidth variability.

2. Description of the Related Art

A near on-demand system broadcasts a digital signal at staggered time intervals to a number of local subscribers. As a result, any particular subscriber must wait at most one time interval before the signal is available. Hence, the selection is available "near" on-demand. Hughes Aircraft Company provides a direct digital broadcast system known as DIRECTV®, which broadcasts television programming at regular intervals via satellite. Cable stations provide staggered broadcasts over the existing cable networks.

The DIRECTV® and cable systems allocate a number of channels or equivalently a portion of the total digital bandwidth, and repetitively broadcast the digital signal on each channel at staggered starting times. The number of channels required to deliver the staggered signal is inversely proportional to the broadcast time interval, i.e. the length of time between staggered broadcasts. For example, these systems allocate 3 channels to deliver a 90 minute movie at 30 minute intervals. To reduce the interval to 15 minutes, the system must double the number of channels to 6.

The number of different selections that can be broadcast simultaneously is limited by the number of channels assigned to each digital signal and the total available bandwidth. Thus, the number of selections available to the subscribers must be traded off against the length of the time interval. Given the limited bandwidth of existing systems, time intervals less than approximately 30 minutes are not cost effective.

The DIRECTV® and cable systems include local receivers for downloading the digital signals, selecting the requested signal, and then passing it on to a local processor, which converts the signal into a standard video format. The local receivers have a small first-in first-out (FIFO) buffer that is capable of storing only a small portion of the signal while sequentially downloading the signal and passing it on to the local processor. The contents of the FIFO buffer are constantly updated as the signal is downloaded. As a result, the subscriber has no control over the broadcast beyond the initial selection. Once the broadcast begins, the subscriber cannot pause or rewind the video. Many subscribers consider this a substantial limitation.

U.S. Pat. No. 5,414,455 entitled "Segmented video on demand system" to Hooper et al. discloses a centralized video on-demand system that sequentially broadcasts segments of a video signal to a plurality of local customers. The segmented broadcast reduces bandwidth requirements by allowing some requests to be synchronized and enables customer interaction and control of the broadcast. If two or more customers request the same video within a few minutes of one another, the system broadcasts the first request at a normal playback rate and broadcasts the later requests at a higher rate until they have caught up to the first signal. At this point, the video delivery is essentially synchronized, and the broadcasts are collapsed into a single broadcast. The local receivers have buffers for storing the higher rate signal and playing it back at the normal rate. However, only requests that are fairly close in time can be combined. Thus, to service all customer requests the system must still use several channels. Furthermore, the high rate broadcast used to synchronize the channels causes a spike in the peak bandwidth requirement of the communication channel. The segmented broadcast does allow the customer to pause, rewind and fast forward, although movement is generally limited to the currently available segment and may cause that user to lose synchronization.

SUMMARY OF THE INVENTION

In view of the above problems, the present invention provides a near on-demand delivery system with reduced average bandwidth, reduced peak bandwidth variability, and user interaction capabilities.

This is accomplished by dividing the digital signals into sequences of N numbered fragments where the length of each fragment is equal to the broadcast time interval. The fragments are broadcast continuously so that the first fragment is repeated every broadcast time interval, the second fragment is repeated every two time intervals and so forth until the Nth fragment is repeated at least every Nth time interval. As a result, the average bandwidth of the broadcast signal increases only logarithmically, instead of linearly, as the broadcast time interval is reduced. A fractal channel packing algorithm is preferably used to sequence the fragments over a plurality of channels to reduce the variability in peak bandwidth caused by fragmentation.

In response to a subscriber's request, the fragments are downloaded and stored locally during successive time intervals so that the first fragment is available within one time interval from the request and the higher numbered fragments are available within their respective periods. The fragments are read out in order and integrated to seamlessly deliver the requested signal. Limited interaction capabilities such as pause and rewind are facilitated by the local storage of the fragments. While the above techniques are ideally suited to video and audio, which are typically accessed in a sequential fashion, these techniques may be useful for any sequentially accessed data. For example, hierarchically compressed images can be transmitted from low to increasingly higher resolutions.

These and other features and advantages of the invention will be apparent to those skilled in the art from the following detailed description of preferred embodiments, taken together with the accompanying drawings, in which:

DETAILED DESCRIPTION OF THE INVENTION

The present invention dramatically reduces the bandwidth required to deliver near on-demand digital information such as video and audio, thus allowing digital selections to be broadcast more frequently. This is accomplished by fragmenting the digital signal into a sequence of N numbered fragments, sequencing the fragments over multiple broadcast channels such that the first fragment is repeated every broadcast time interval, the second fragment is repeated at least every two time intervals, and so forth until the Nth fragment is repeated at least every Nth time interval, storing the requested fragments with each local subscriber, and reassembling the fragments to present a seamlessly integrated signal to the subscriber within one time interval from the subscriber's request. The lower numbered fragments are preferably broadcast with a period equal to their number to reduce the average bandwidth while the higher numbered fragments are preferably broadcast with a period less than or equal to their number to reduce variability in the peak bandwidth requirement.

Fragmenting and sequencing in this manner reduces the minimum average bandwidth from N channels in conventional systems to:

$$\sum_{r=1}^{N} (1/r), \quad (1)$$

which converges to ln(N) as N becomes large. Thus, in the present invention the required bandwidth increases only logarithmically as the number of fragments increases, or equivalently as the time interval is reduced, whereas in existing systems the bandwidth increases linearly. Furthermore, by employing efficient channel packing schemes, such as fractal trees, the variation in peak bandwidth can be greatly reduced to the point that the peak bandwidth requirement is approximately uniform and only marginally greater than the average bandwidth. The provision of local storage not only facilitates reassembly of the fragments, but allows the subscriber to maintain limited interactive control including pause and rewind over the signal. In addition, the lower numbered fragments for the available signals can be prestored locally, thereby further reducing the bandwidth needed to provide near on-demand service.

Figure 1:
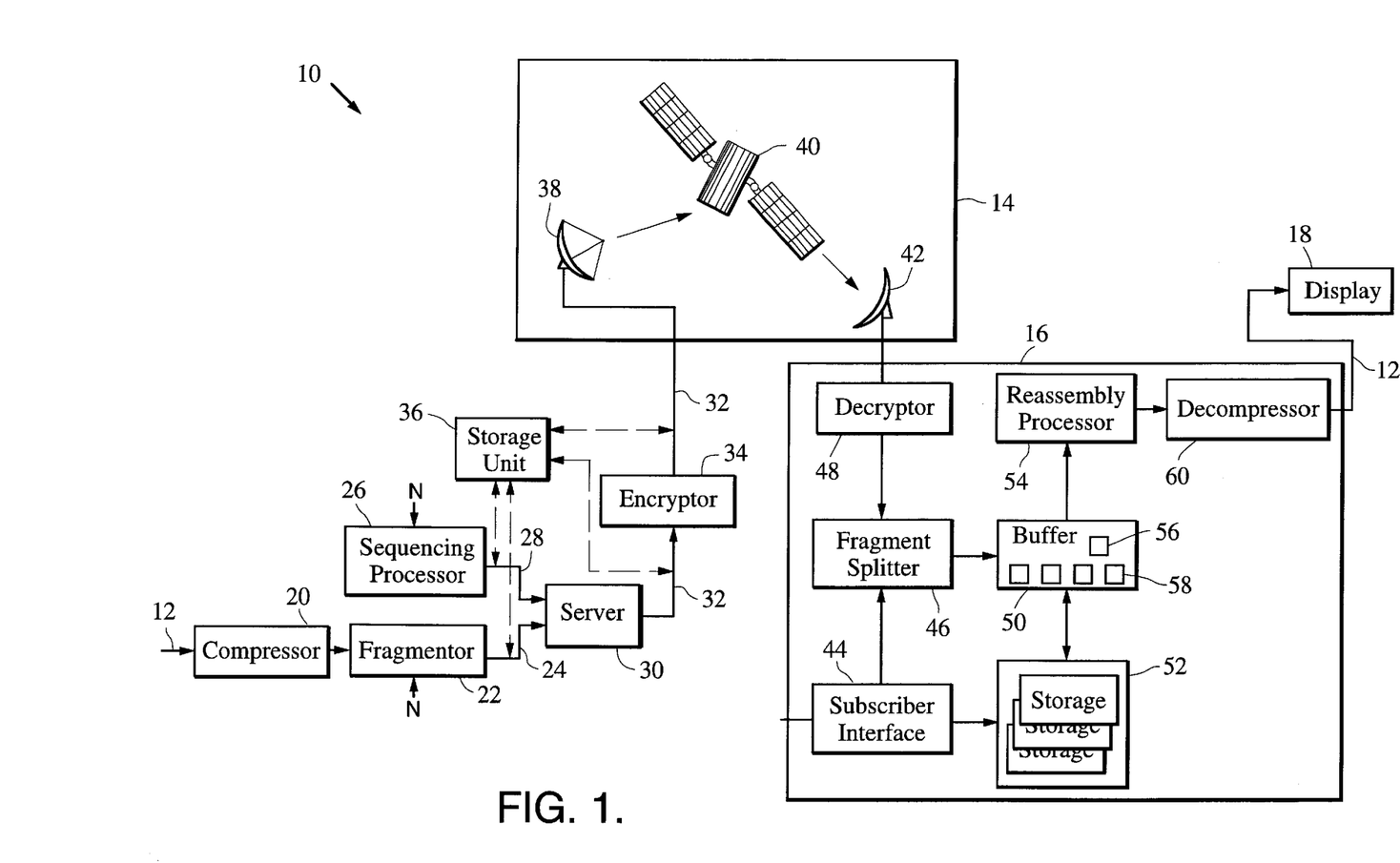
FIG. 1 is a block diagram of a near on-demand digital delivery system in accordance with the present invention.
Figure 2:
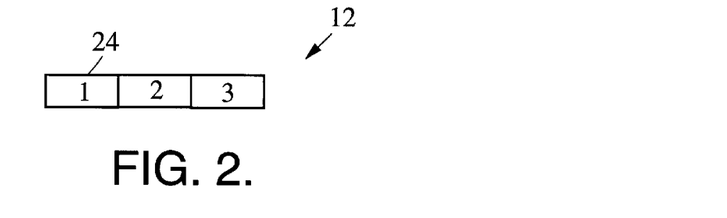
FIG. 2 is a diagram depicting a sequence of numbered fragments.

As shown in FIG. 1, a near on-demand digital delivery system 10 fragments and sequences a digital signal 12 for continuous broadcast over a digital transport system 14 to a number of subscribers. In response to a subscriber's request, the subscriber's local server 16 down loads, reassembles and plays back the fragments on the subscriber's playback device 18. The delivery system preferably includes a compressor 20 that compresses the digital signal 12 into a compressed signal, also 12. The conventional Motion Picture Entertainment Group (MPEG2) compression algorithm provides approximately two orders of magnitude of compression while maintaining sufficient signal quality. A fragmentor 22 segments the compressed signal 12 into a sequence of N numbered fragments 24 in which each fragment 24 is preferably tagged with its fragment number and title. As shown in FIG. 2, a 90 minute video 12 can be segmented into three 30 minute fragments 24. Alternately, the signal could be divided into other fragment intervals, such as ninety one minute fragments.

A sequencing processor 26 uses a channel packing algorithm (details of which are provided in connection with FIGS. 3 through 8) to generate a sequencing pattern 28, in which each fragment is assigned a broadcast period and a timing offset so that the first fragment is repeated every time interval, the second fragment is preferably repeated every two time intervals and so forth until the Nth fragment is repeated at least every Nth time interval. The higher numbered fragments can be backfilled into the shorter broadcast periods to reduce the peak bandwidth variability at the expense of increasing the average bandwidth. The preferred amount of backfilling will depend upon the number of fragments N, the efficiency of the channel packing algorithm, and the relative importance of peak bandwidth variability versus average bandwidth. A server 30 uses the sequencing pattern 28 and the fragments 24 to generate a multi-channel data stream 32, which is encrypted by an encryptor 34. The digital transport system 14 broadcasts the encrypted data stream to the local subscribers. Broadcasting the fragments in accordance with the sequencing pattern enables the local server to reassemble the signal within one time interval from the subscriber's request (see FIG. 9 for details) and provides approximately the minimum average bandwidth $$\sum_{r=1}^{N} (1/r).$$

Although each function must be executed to broadcast the data stream 32, some or all of the operations can be done off line with the results being stored in a storage unit 36 for on line readout or distribution over a local area network (LAN). For example, the encrypted data stream could be generated and stored off line such that the digital transport system would simply readout and broadcast the data stream. At the other extreme, all of the operations can be done on line in real time.

The digital transport system 14 allocates the required number of channels and broadcasts the data stream 32 to each of the local servers 16. As used herein, the broadcast channels may be discrete channels or portions of the digital bandwidth. Thus, the number of discrete channels or the amount of digital bandwidth changes as the peak bandwidth changes. Because the present invention reduces the amount of bandwidth required to transmit at a given time interval, existing transport systems including commercial satellites and wire networks, as well as the next generation of fiber optic and cable networks, can simultaneously broadcast either more selections or can reduce the time interval. The transport system 14 as shown is a satellite network that includes a central transmitter 38, a broadcast satellite 40, and a plurality of local receivers 42. The central transmitter 38 transmits the encrypted data streams to the broadcast satellite 40, which in turn retransmits the sequences to the local receivers 42.

Each local server 16 includes a subscriber interface 44 for communicating the programming schedule to the subscriber and for requesting a particular selection. The playback device 18 preferably includes a display for displaying the programming schedule and a remote for requesting the selection. The subscriber interface 44 directs a fragment splitter 46 in the local server 22 to retrieve the fragments for the requested selection. A decryptor 48 decrypts each channel's data stream as it is received by receiver 42 and passes the numbered fragments to the fragment splitter 46 at each successive time interval. In the preferred embodiment, the fragment splitter 46 identifies each fragment by its tagged selection title and fragment number. Alternately, the sequencing pattern could be transmitted to the local server 16 and used to extract the untagged fragments. The fragment splitter 46 writes the fragments to a buffer 50, which in turn writes them into a local storage 52. The buffer 50 is preferably a dual-port buffer having simultaneous read/write capabilities so that the fragment splitter 46 can write to it at the same time that a reassembly processor 54 reads out the next fragment. The local storage preferably includes enough memory, suitably 1.5 Gbyte, to store at least one complete selection, and a processor for controlling data transfer to and from the memory. In an alternate embodiment, giving up the pause and rewind capabilities reduces the storage requirements by half.

The fragment splitter 46 writes the next fragment 24 that the reassembly processor needs, if the fragment is broadcast during that time interval, into a read location 56 and writes the remaining subsequent fragments 24, if any, into respective write locations 58 in the buffer 50. The local storage 52 reads the fragments from the buffer's write locations 58 and stores them. The local storage 52 writes the next fragment, when it is not directly available from the fragment splitter 46, into the buffer's read location 56. As a result, the first fragment 24 is written into the buffer's read location 56 within one time interval of the subscriber's request, and each successive fragment 30 is written into the read location as the previous fragment is being read out. The reassembly processor 54 seamlessly integrates the successive fragments 3024 and passes the sequence to a decompressor 60, which inverts the operation of the compressor 20 and delivers the decompressed digital signal 12 to the subscriber's playback device 18.

The present invention provides limited subscriber interaction capabilities via the subscriber interface 44 by storing the fragments 24 in the local storage 52 until the subscriber has finished viewing or listening to the selection. A pause function is implemented by suspending the read out operation from the buffer. The fragment splitter 46 can continue to fill the local storage with the remaining fragments or can suspend its own operation. A rewind function is implemented by writing previous fragments from the local storage into the buffer. The system cannot implement a fast forward function because the sequencing pattern only guarantees that the next fragment will be available when sufficient time has elapsed for the fragment to be viewed under normal playback conditions.

The system's bandwidth requirements can be further reduced by prestoring some of the lower numbered fragments for each selection in the local storage 52. The lower numbered fragments must be repeated more frequently and thus require relatively more bandwidth than the higher numbered fragments. The benefits of prestorage are discussed below in conjunction with FIGS. 4 and 8.

Figure 3:
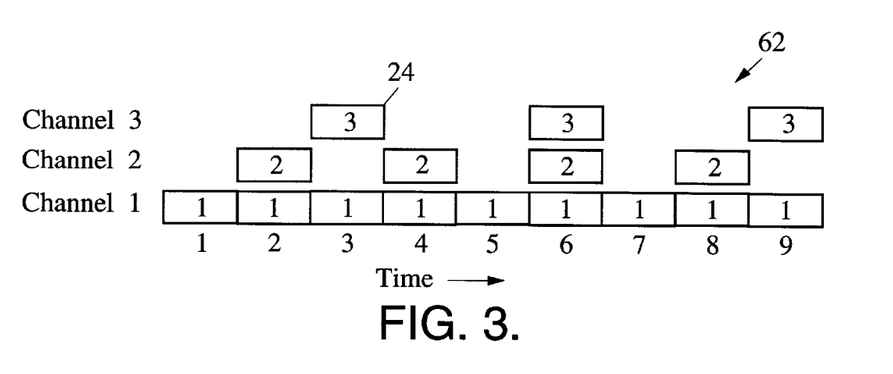
FIG. 3 is a sequencing diagram illustrating the reduced average bandwidth capabilities of the present invention.

As shown in FIG. 3, a simple channel packing algorithm operates on the sequence of fragments 24 shown in FIG. 2 to generate a sequencing pattern 62. The first channel is dedicated to the first fragment so that the fragment is repeated every time interval. The second and third fragments are assigned to the second and third channels, respectively, with periods of two and three time intervals. This simple sequencing pattern meets the requirements of broadcasting the jth fragment at every jth time interval and provides minimum average bandwidth, $$\sum_{r=1}^{3} (1/r) = 1.83$$

channels. However, the peak channel capacity varies from one to three channels.

Figure 4:
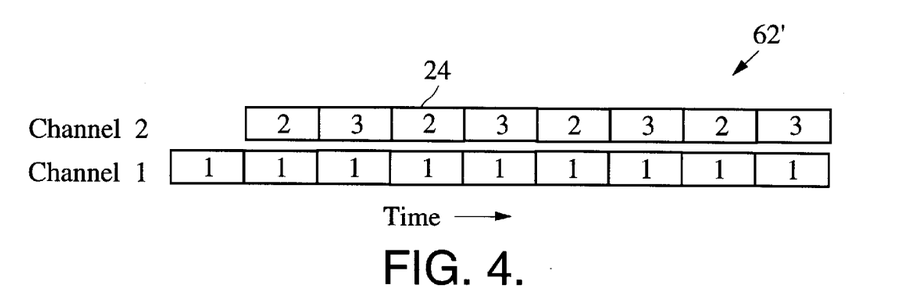
FIG. 4 is a sequencing diagram illustrating the backfilling of fragments to reduce variability in peak bandwidth requirements.

As shown in FIG. 4, the fragments 24 in the third channel having period three are backfilled into the open slots in the second channel having a period of two. This increases the average bandwidth from 1.83 channels to 2.0 channels, but the peak channel capacity is fixed at 2 channels. Depending on the system priorities, the sequence 62 shown in FIG. 3 or the sequence 62' shown in FIG. 4 may be preferable. Furthermore, if the first fragment of the selection is prestored, both the average and the peak bandwidth will be reduced by a full channel.

Figure 5:
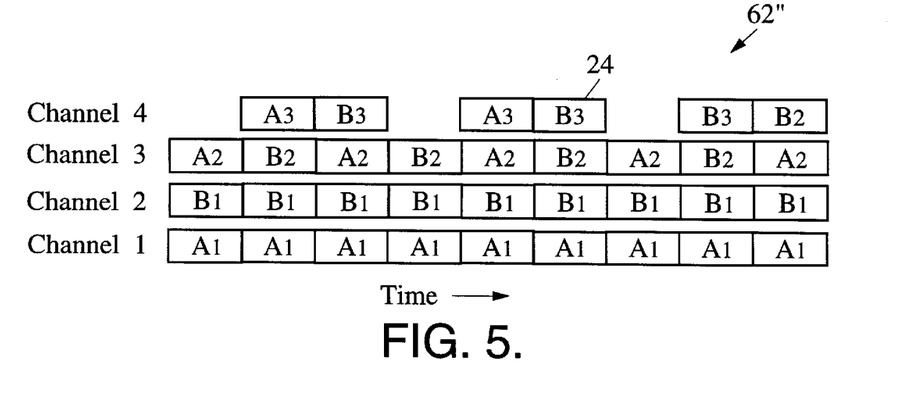
FIG. 5 is a sequencing diagram illustrating the merging of two different selections to reduce bandwidth.

FIG. 5 illustrates a sequencing pattern 62", in which two different selections, each having the sequencing pattern shown in FIG. 3, are merged to reduce variations in peak bandwidth. If the two selections are sequenced and broadcast independently, the peak bandwidth will vary from one to six channels. However, by merging the selections the peak bandwidth varies between three and four channels. This is accomplished by offsetting the like numbered fragments, except the first fragment, and then merging them into a single channel.

Fractal channel packing algorithms exploit the properties of numerical sequences to generate sequencing patterns which result in more uniform peak bandwidth requirements, and average bandwidths that are only marginally greater than the minimum average bandwidth. As a simple illustration, consider filling a channel first with fragments of period 2 and then with fragments of period 4, and so on up to period $2^n$, where n can be arbitrarily large. The channel can be bifurcated in this manner indefinitely because each time a new fragment is added only half of the remaining bandwidth in the channel is used. If we picture this process of dividing up a channel as splitting a line into two branches and then recursively choosing one branch and further splitting that into two, we end up with a tree like structure with self-similar elements. We refer to these structures as fractal trees. The above example demonstrates how fractal trees can be used to determine efficient packing of a single channel.

A fractal channel packing algorithm has six different aspects: tree selection, expansion, notation, period computation, tree filling and channel packing. Tree selection entails selecting the number of fractal trees and their root numbers. The number of trees will be at least the greatest integer of the minimum average bandwidth, i.e.

$$\left[\sum_{r=1}^{N}(1/r)\right]$$

where [·] is the greatest integer function of the argument represented by ·, and typically at most one plus the greatest integer of the natural log of N, i.e. 1+[ln(N)]. The root numbers Pj in a base set are the successive prime numbers 1,2,3,5,7,11 . . . up to the number of trees.

Each fractal tree can be expanded by splitting its root node into Pj branches Bi numbered from i=0 to Pj−1, which terminate at leaf nodes Ri having respective prime number values Pi. Each leaf node then spawns a subtree with a prime number root Pi, where P0=1, P1=2, P2=3, P3=5, P4=7. Each leaf node in each subtree then spawns another subtree. The expansion of the fractal trees in the base set continues until enough leaf nodes have been generated to schedule each of the N fragments. Fractal trees can be generated by alternate expansion schemes. For example, the order of the branches and subtrees can be changed, or the prime number roots of each subtree Pi can be independent of the branch number Bi from which they extend.

Each leaf node is represented by an ordered set of (Ri,Bi) pairs. The ordered set for a particular leaf node is generated by tracking from the tree's root node through intermediate leaf nodes to that particular node and then renumbering the roots and branches from 1 to m, where m is the number of nodes. In general, any leaf node is described by [(R1,B1) (R2,B2) . . . (Rq, Bq)] where R1 is the root prime number Pj, B1 is the number of the traversed branch, Rq is the prime number root of the leaf node prior to the specified leaf node and Bq is the number of the traversed branch to the specified leaf node.

The broadcast period T assigned to each leaf node is the product of the nodes Rk traversed from the root node to the particular leaf node, and is computed as follows:

$$T = \prod_{k=1}^{q}(Rk) \tag{2}$$

where q is the number of leaf nodes traversed for each of said leaf nodes. Thus, the period T is the product of the prime numbers Pk assigned to each traversed node Rk. As a result, as one traverses a fractal tree the periods assigned to successive leaf nodes increase in accordance with the fractal number sequence. For example, if the root is 2, the tree is split into two branches 0 and 1 that terminate in leaf nodes having periods of 2. The 0 leaf node spawns a subtree with a prime root P0=1, which in effect terminates that branch. The 1 leaf node spawns a subtree with a prime root P1=2, which splits the node into two branches 0 and 1 that terminate in leaf nodes having s of 4, and so forth. The trees in the base set are expanded up to the point at which the next leaf node would have a period T>N. There is no reason to generate leaf nodes whose periods exceed the maximum allowable period N for broadcasting the fragments because they could not be used.

The fractal trees are filled by first assigning the enumerated fragment numbers to the leaf nodes whose respective periods are equal to the fragment number. Together the J fractal trees leaf nodes enumerate all the fragment numbers from 1 to N, except for the prime numbers that are not in the base set and the prime multiples of the excluded prime numbers. The excluded prime numbered fragments and multiples thereof are backfilled into leaf nodes whose periods are smaller than the fragment number. Furthermore, the enumerated fragments in the sparsely populated trees are preferably backfilled into earlier trees to reduce peak bandwidth variation.

The fragments in each fractal tree are packed into respective broadcast channels so that the fragments are broadcast at their assigned periods. To accomplish this the fragments in each channel are offset in time relative to one another so that two fragments never occur at the same time. The offset for a particular leaf node, and hence its assigned fragment is computed as follows:

$$\text{Offset} = \sum_{p=2}^{q} Bp \prod_{k=1}^{p-1} Rk + B1 \tag{3}$$

Sequencing the fragments in accordance with the fractal tree assignments and offsets reduces the average bandwidth so that it is only marginally greater than the minimum bandwidth for fragmented sequences, and also reduces the peak bandwidth variation.

Figure 6:
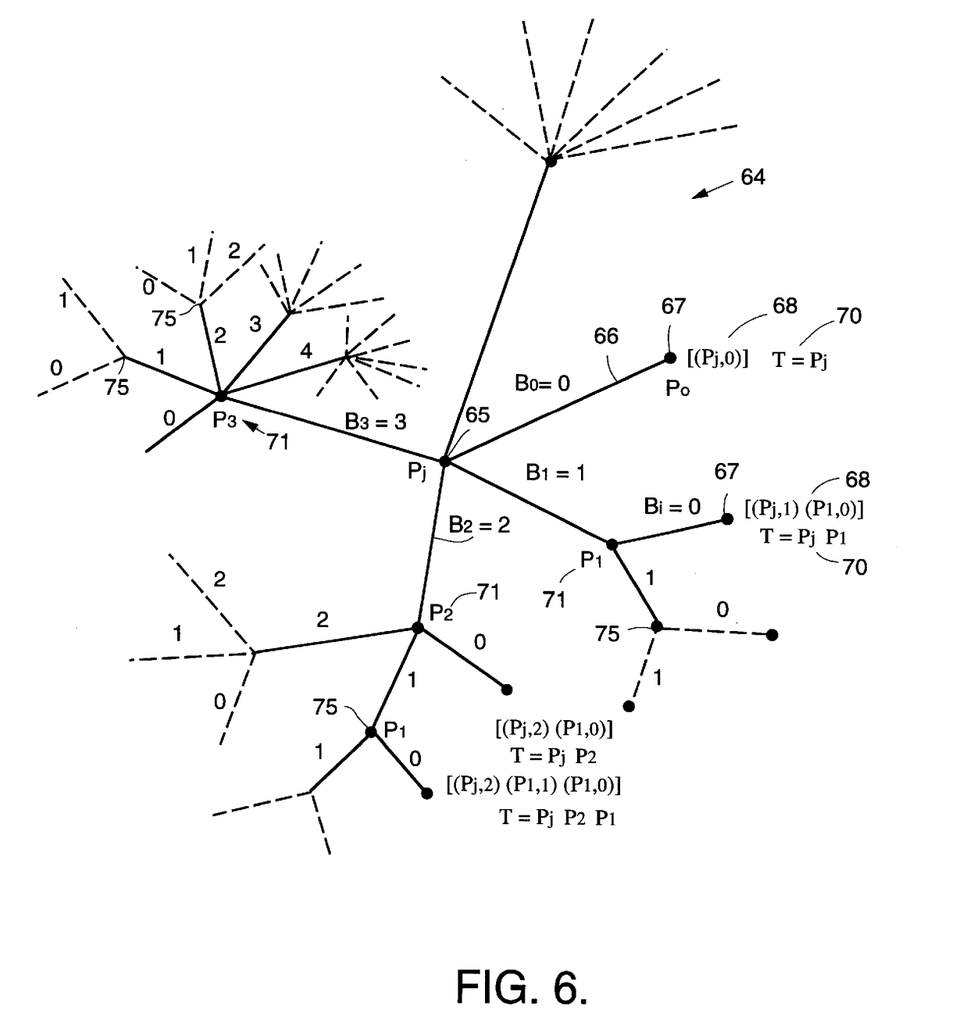
FIG. 6 is diagram of a pth order fractal tree.
Figure 7A:
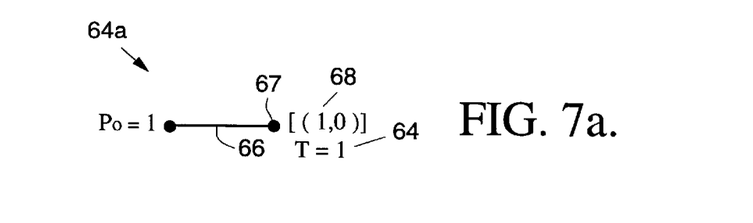
FIGS. 7a, 7b, 7c and 7d are fractal trees for a fragment sequence of length N=10.
Figure 7B:
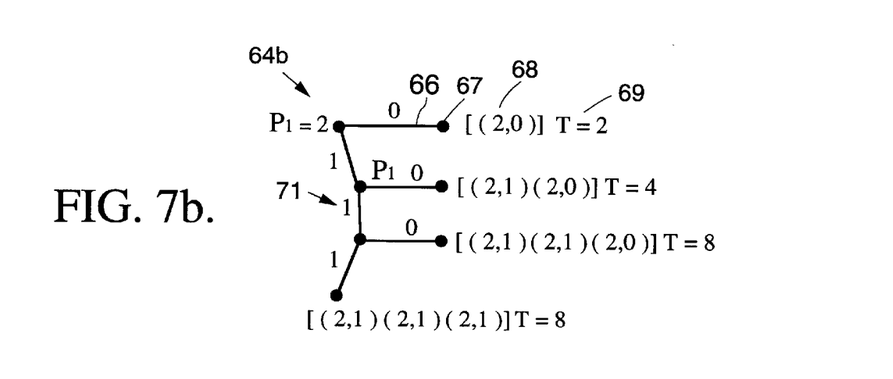
Figure 7C:
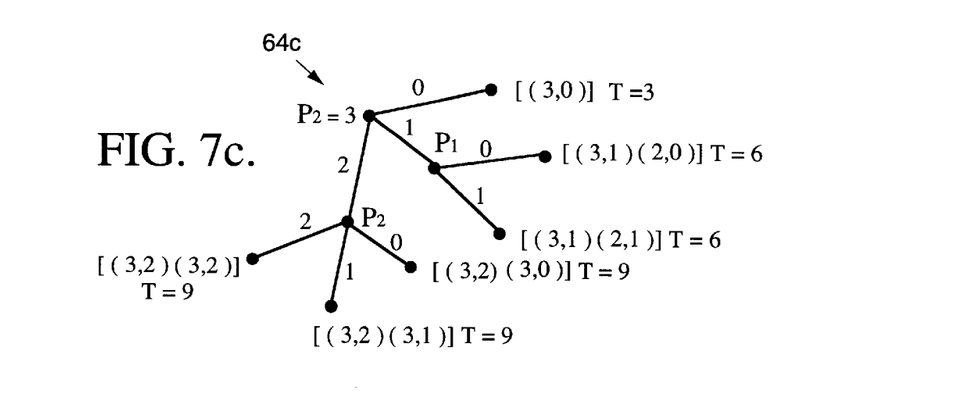
Figure 7D:
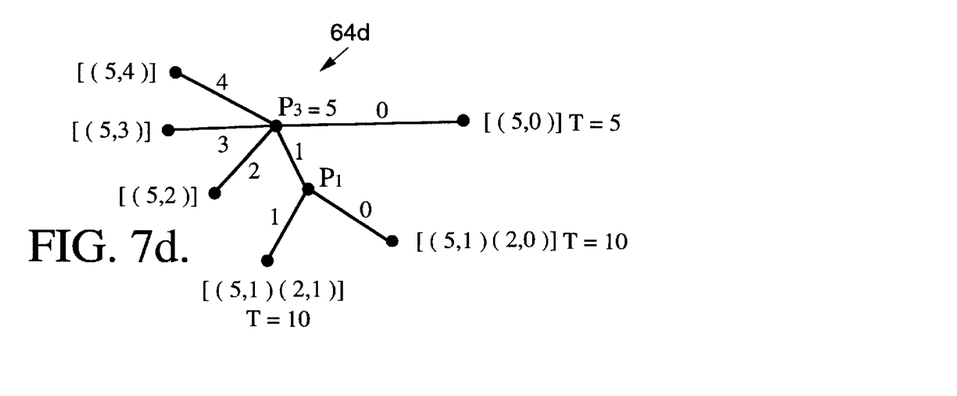
Figure 8:
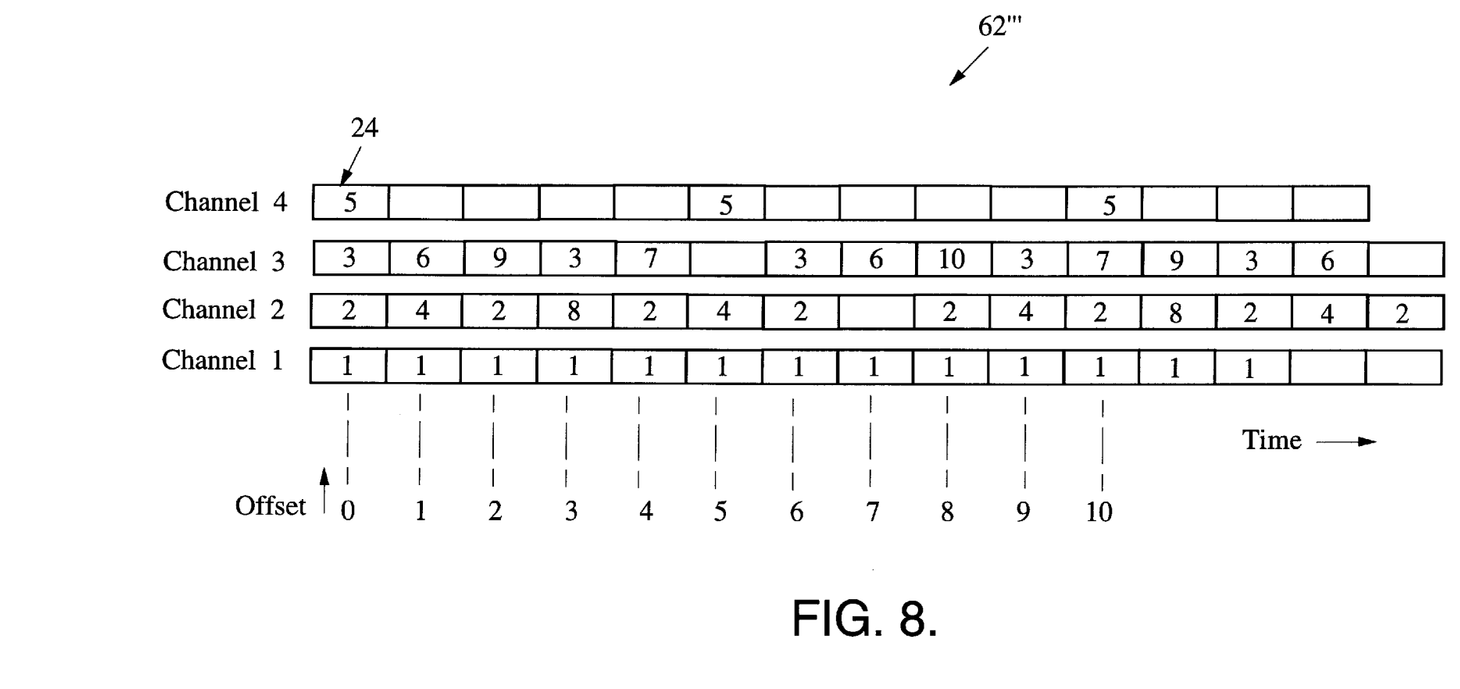
FIG. 8 is a sequencing diagram for the fractal trees shown in FIGS. 7a through 7d.

FIGS. 6, 7 and 8 illustrate a method for assigning periods and offsets to the fragments. FIG. 6 illustrates a fractal tree 64 for the jth prime number $P_j$. The tree's base node R 65 is split into $P_j$ branches Bi 66, which are numbered from i=0 to Pj−1 and terminate at respective leaf nodes Ri 67. Each leaf node 67 is notated by an ordered set of (R i,Bi) pairs 68 and a period T 70. Each leaf node 67 then spawns a subtree 71 with a prime number root Pi, where P0=1, P1=2, P2=3, P3=5, P4=7. Each leaf node 67 in each subtree 71 then spawns another subtree 75. The fractal trees 64 in the base set are expanded up to the point at which the next leaf node would have a period greater than the maximum allowable period N.

FIGS. 7a through 7d illustrate four fractal trees 64a–64d, respectively, that can be used to generate the sequencing pattern for a sequence of length N=10. The first fractal tree 64a has a single branch 66 with a period of 1. The second fractal tree 64b first splits the root node 65 into two branches 66 having periods of 2. The first branch is terminated at leaf node 67 with period 2 and the second branch spawns a subtree 71 having a root of 2. The second branch of the subtree spawns another subtree having branches with period 8. At this point, the expansion of the base 2 fractal tree is terminated because further expansion would produce a leaf node 67 having a period of 16, which exceeds the maximum allowable period of 10.

The third fractal tree 64c first splits the root node into three branches 66 that are terminated at nodes 67 having periods of 3. The three nodes spawn respective subtrees 71 P0, P1 and P2. The first subtree terminates with period 3, the second subtree splits into two branches 66 with period 6, and the third subtree is split into three branches with period 9. Further expansion of the branches would increase the period beyond 10, and thus the tree is terminated. The fourth fractal tree 64d splits the node into five branches that terminate in nodes having periods of 5, expands the second branch into a subtree having two branches with period 10, and terminates. The four fractal trees enumerate all numbers from 1 to 10 except the prime number 7, which does not form the base of any of the trees.

As shown in FIG. 8, the fragments corresponding to the branches of the fractal trees 64a–64d in FIGS. 7a–7d are assigned to the designated channels that have the branches' associated periods. The excluded prime number 7 is backfilled into the extra period 6 slot in the third fractal tree 64c, as shown in FIG. 7c. The 10th fragment is also backfilled from the sparsely populated 4th channel into the extra period 9 slot in the third fractal tree 64c, as shown in FIG. 7c.

For N=10 fragments, offset equation 3 simplifies as follows:

m=1: Offset=B1

$m=2$: Offset=$(B2 \times R1)+B1$, and $m=3$: Offset=$B3(R2 \times R1)+(B2 \times R1)+B1$.

In channel 1 the first fragment has an offset of zero and is repeated every time interval. In channel 2, fragment 2 has an offset of zero, fragment 4 has an offset of 1, and fragment 8 has an offset of 3. In channel 3, fragments 3, 6 and 9 have offsets of 0, 1 and 2, respectively. Prime fragment 7 is backfilled into a period 6 slot having an offset of 4 and fragment 10 is backfilled into a period 9 slot having an offset of 8. In channel 4, fragment 5 has an offset of 0. As a result, the fragments in a channel are intermeshed so that each fragment is broadcast at its assigned period.

The sequencing pattern 62''' shown in FIG. 8 has an average bandwidth of 2.96. The minimum average bandwidth for a sequence of length N=10 is 2.93. The peak channel capacity does vary from 1 to 4 channels but only occasionally, and remains at 3 channels most of the time. As N increases the power and efficiency of the fractal channel packing algorithm increases so that the average bandwidth is only marginally larger than the minimum average bandwidth, and the variability in the peak bandwidth is reduced so that the bandwidth requirement is almost constant.

The average bandwidth can be further reduced by prestoring some of the lower numbered fragments. The simplest case is to prestore only the first fragment, which removes an entire channel. In general, the first K segments can be prestored. As a result, the minimum average bandwidth is given by $$\sum_{r=K+1}^{N} (1/r),$$

which in the limit converges to $\ln(N/K)$, where K/N is the fraction of the total signal that is prestored. Thus, as the percentage of prestored data increases the average bandwidth is reduced logarithmically. For example, if 10% of the signal is prestored the limit converges to $\ln(10)$ whereas for 20% the limit is $\ln(5)$. However, the local storage requirements increase linearly as the percentage is increased.

Prestoring the first K segments and deleting them from the sequencing pattern would produce the maximum reduction in average bandwidth. However, the lower numbered channels would be only sparsely populated so that the peak bandwidth would vary substantially. The peak bandwidth variability can be reduced by backfilling the higher numbered fragments into the slots opened up by prestorage. However, this will increase the average bandwidth.

Figure 9:
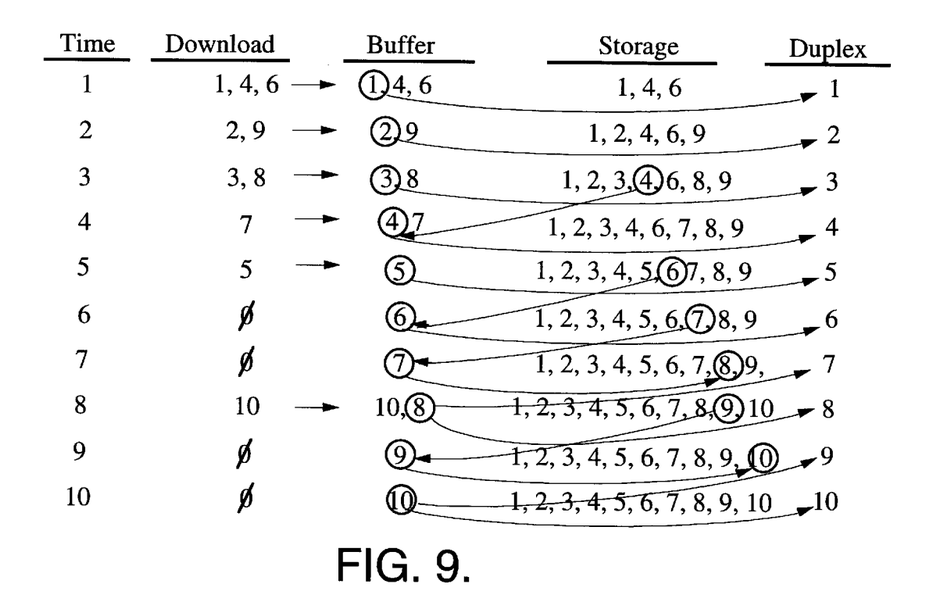
FIG. 9 is a table illustrating the operation of a local server in reassembling the sequenced fragments to deliver a seamlessly integrated signal to the subscriber.

FIG. 9 is a table that illustrates the steps of downloading and reassembling the fragments in accordance with the sequencing pattern shown in FIG. 8 to deliver a seamlessly integrated signal to the subscriber. In this example, the subscriber requests a particular selection during the 0th time interval. Thus, starting at the 1st time interval the local server downloads the 1st, 4th and 6th fragments and writes them into the buffer. The reassembly processor simultaneously reads out the 1st fragment and sends it to the playback device. Concurrently, the local storage reads out the 4th and 6th fragments and stores them. At the next time interval, the local server writes the 2nd and 9th fragments to the buffer, which are read out by the reassembly processor and local storage, respectively. At the 3rd time interval, the local server writes the 3rd and 8th fragments to the buffer, which are read out by the reassembly processor and local storage, respectively. At the 4th time interval, the local server writes the 7th fragment to the buffer and the local storage writes the previously stored 4th fragment to the buffer's read location. The local server and storage cooperate in this manner to download, store and write the next fragment to the buffer's read location until the signal is completed. The exact interaction between the fragment splitter, buffer, local storage and reassembly processor will depend upon when the subscriber makes the request, but the result will always be a seamlessly integrated signal.

Figure 10:
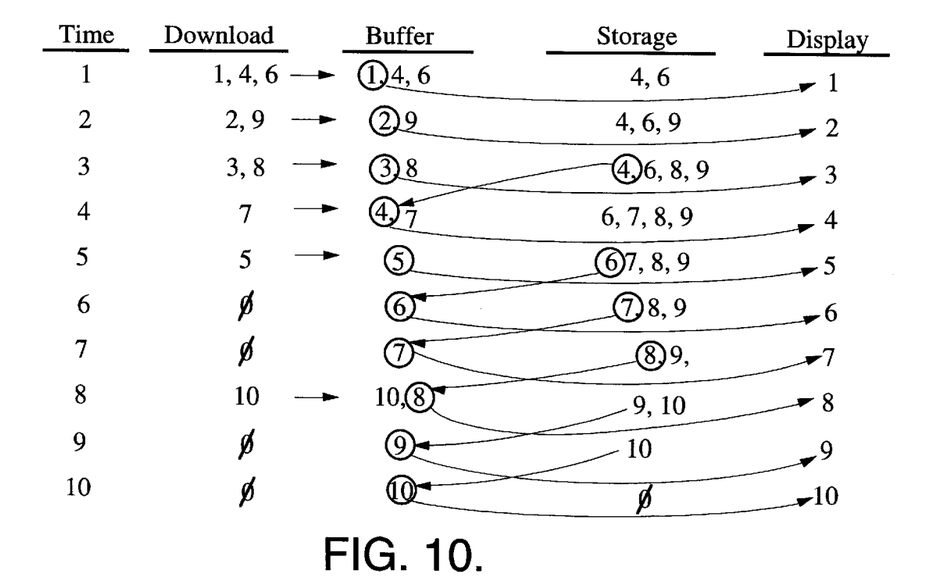
FIG. 10 is a table illustrating the operation of the local server without the rewind capability.

As shown in FIG. 9, the local storage must be large enough to store an entire selection. The storage requirements can be reduced by approximately one half by eliminating the "rewind" capability as shown in FIG. 10, When the reassembly processor reads out the next fragment from the local storage it also deletes the fragment from the local storage. As a result, the local storage will never be required to store more than half of the selection.

Figure 11:
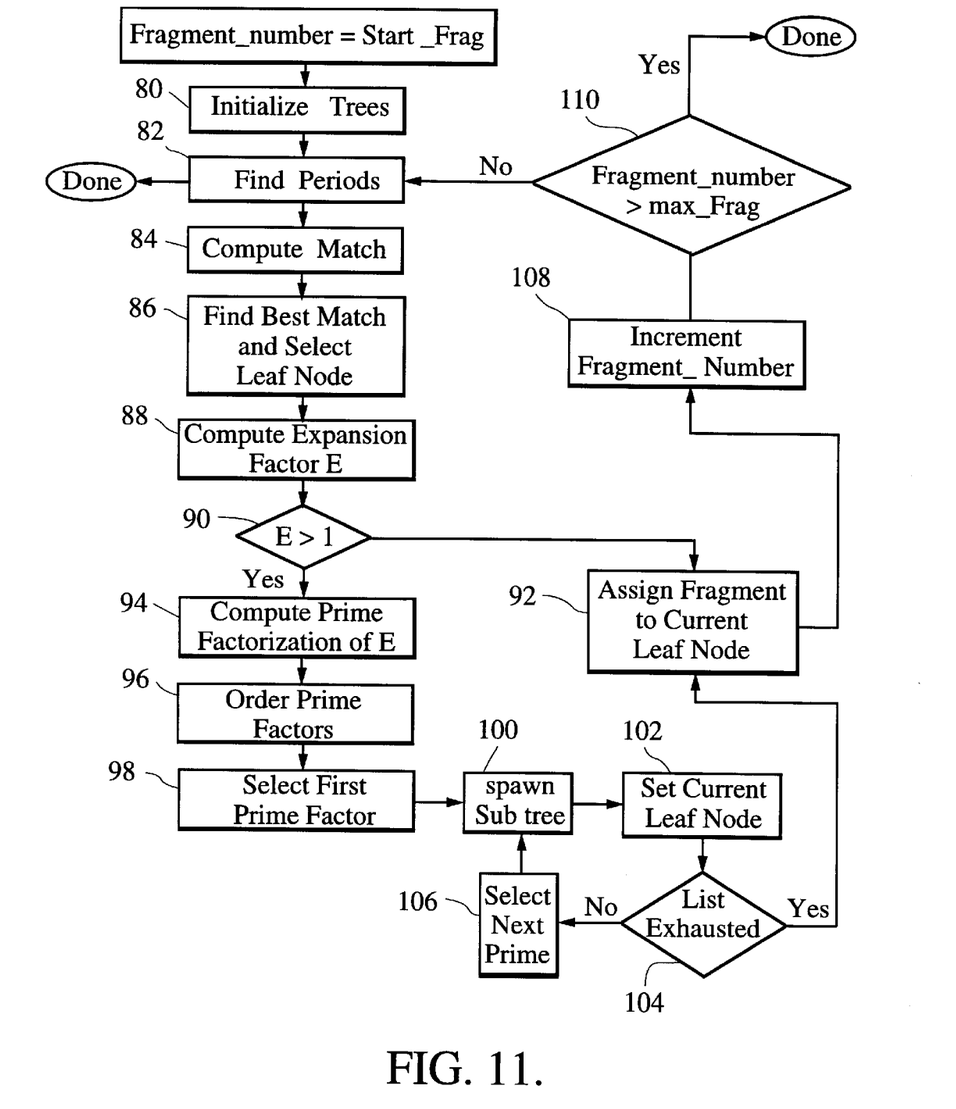
FIG. 11 is a flow chart describing the preferred method for assigning periods and offsets to fragments.

FIG. 11 illustrates a preferred method for assigning periods and offsets to the N fragments. This method applies both to the case where no fragments are pre-stored as well as the case where the first L fragments are pre-stored locally with the users. A constant start_frag is the number of the first fragment that is transmitted to the user. If no fragments are pre-stored, start_frag=1 and if L fragments are pre-stored then start_frag=L+1. A control variable fragment_number is initialized to start_frag.

In the first step 80, "Initialize Trees", the fractal trees that are used to allocate the fragments are initialized. The number of fractal trees initialized equals the number of equivalent channels (M) of allocated bandwidth. The root number Pj in the base set are the successive prime numbers 1, 2, 3, 5, 7, 11, . . . up to the number of trees. When k trees are initialized, they are assigned root numbers from P1 to Pk in succession. In general, the assignment starts with the prime number 2 for all sequences where the first fragment is two or greater. Upon initialization, each fractal tree is expanded by splitting its root node into Pj branches Bi numbered from i=0 to Pj−1 and terminating it at unassigned leaf nodes. Each leaf node remains unassigned until it is expanded with a sub-tree or a fragment is assigned to the leaf node.

In step 82, "Find Periods", the broadcast period T of a given leaf node is the product of the leaf nodes Rk traversed from the root node to the particular leaf node, and is computed as follows:

$$T = \prod_{k=1}^{q} Rk \quad (4)$$

where Rk is the prime number of the $k^{th}$ traversed leaf node and q is the number of nodes traversed from the root node to the particular leaf node. The periods of all unassigned leaf nodes in each fractal tree are tallied. The expansion of each fractal tree terminates when all of its leaf nodes have been assigned a fragment.

In step 84, "Compute Match", a score is computed for each unassigned leaf node based on its period. This score is equal to the difference between the current value of fragment_number and the largest integer multiple of the branch period T that is still smaller than the current value of fragment_number, as given by:

Score=fragment_number−$T$*floor(fragment_number/$T$)   (5)

The next step 86 is to find the best, i.e. minimum, match score from the all of the computed scores. The best period T_best is the period corresponding to the best match score. If two match scores are equal, the best period is the largest of the two periods corresponding to these scores. The best fractal tree is the tree containing the leaf node with the best period. Together steps 82, 84 and 86 select the best tree and an unassigned leaf node for a particular fragment.

Once the best fractal tree and leaf node have been selected, the leaf node is expanded and the fragment is assigned to one of the expanded leaf nodes. In step 88, an expansion factor E is computed as the largest integer which when multiplied by T_best will give a result that is less than or equal to the current value of fragment_number. In step 90, if E=1, the current leaf node cannot be expanded any further, and control is transferred to step 92, in which the current value of fragment_number is assigned to the current leaf node. If E>1, then the prime factorization of the expansion factor E is computed in step 94. In step 96, the prime factors are ordered from smallest to largest (Pa, Pb, ... Pn) and the first prime factor Pa is selected as the root of the next subtree (P=Pa)(step 98).

In step 100, a subtree is spawned from the current leaf node with P branches Bi that are numbered from i=0 to P−1. In step 102, the current leaf node is set to the leaf node on the first branch B0 of the new subtree. In step 104, the list of ordered prime is checked to see if has been exhausted. If not, the next prime is selected as the root of the next subtree (step 106) and steps 100 and 102 are repeated recursively to spawn the next subtree from the current leaf node of the previous subtree. For example, if E=8 the prime factors are 2, 2 and 2 and the algorithm recursively spawns three two-branch subtrees. When the list has been exhausted, transfer returns to step 92 and the current value of fragment_number is assigned to the current leaf node.

After the fragment_number is assigned to a leaf node, the value of fragment_number is incremented (step 108). If this value is greater than the maximum number of desired fragments (max_frag) (step 110), the algorithm terminates. Otherwise, the algorithm returns to the "Find Periods" step 82 and continues to fill in the fractal trees until all of the trees are filled or the maximum value of fragment_number is exceeded.

Once the fragments are assigned to the fractal trees' leaves, the trees are used to compute the fragments' periods and sequence offsets. The period of each fragment is determined using equation 4 above. The time offset for a given leaf node is computed as follows:

$$\text{Offset} = \sum_{p=2}^{q} Bp \prod_{k=1}^{p-1} Rk + B1 \quad (6)$$

where q is the number of nodes traversed from the root node to the particular leaf node.

Once the assignments have been made using equations 4 and 6 above, a number of transformations may be performed that will produce different, but equally suitable, sequences. For example, one transformation relabels the branches Bp of a subtree such that the same set of numbers is assigned to the branches in a different order. This merely changes the relative offsets of the fragments in the sequence. Another transformation takes any two segments S1 and S2 that have been assigned periods T1 and T2, respectively, where T1≦T2≦MIN(S1,S2), and swaps positions of S1 and S2 on their respective trees. This swap can occur between two items on the same tree as well as between two items on different trees so long as the periods assigned to both fragments are both less than or equal to the minimum period required for each fragment.

Figure 12:
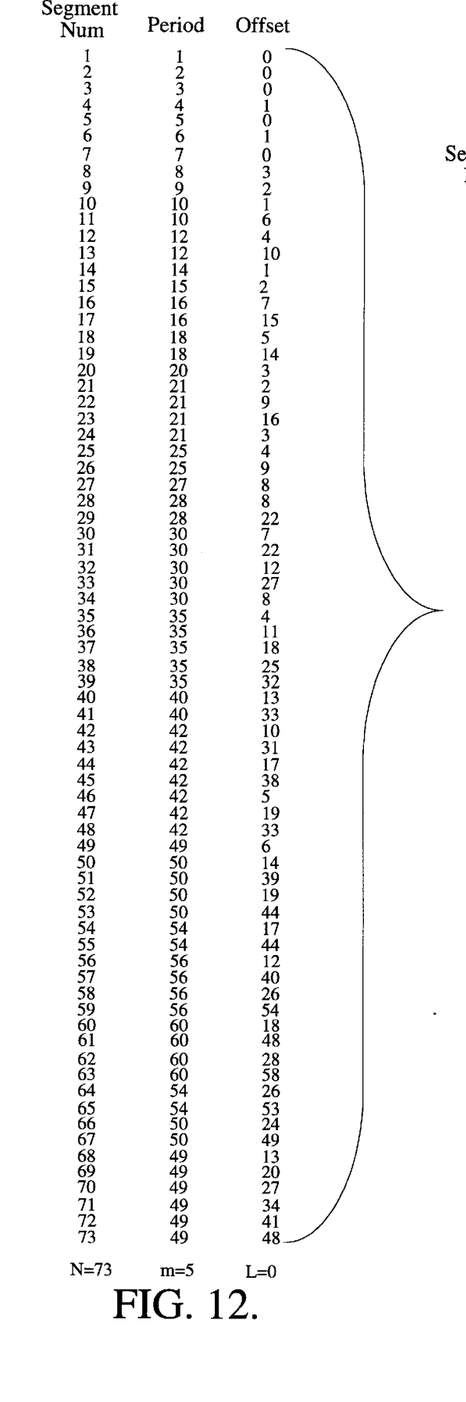
FIG. 12 is a table of fragment assignments for an average and peak bandwidth equivalent to five channels where no pre-storage is used.
Figure 13:
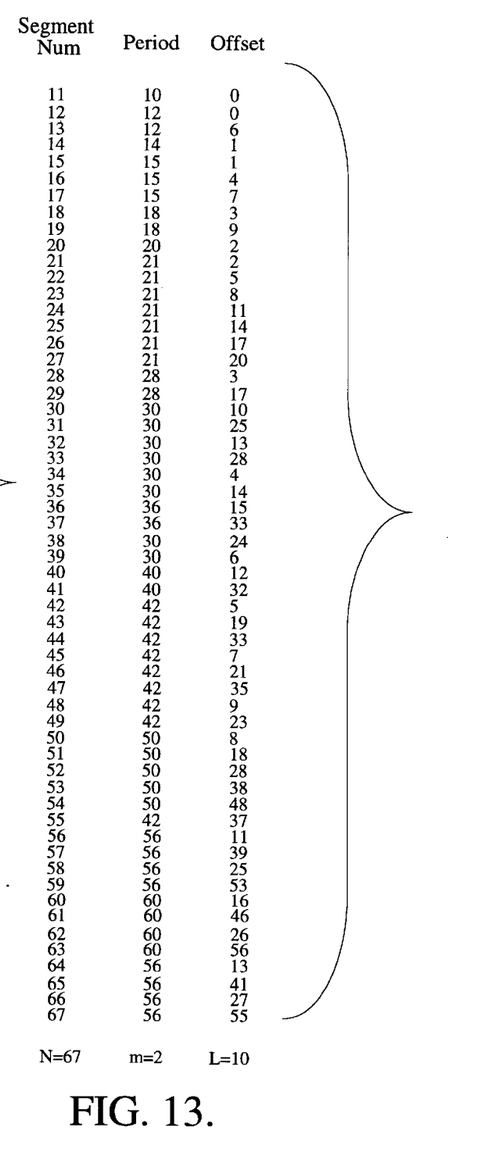
FIG. 13 is a table of fragment assignments for an average and peak bandwidth equivalent to two channels where the first ten fragments are pre-stored.

FIG. 12 is a table of the fragment assignments (period and offset) for an average and peak bandwidth equivalent to five channels in accordance with the preferred algorithm described above where no pre-storage is used. FIG. 13 is a table of fragment assignments for an average and peak bandwidth equivalent to two channels where the first ten fragments are pre-stored.

While several illustrative embodiments of the invention have been shown and described, numerous variations and alternate embodiments will occur to those skilled in the art. Such variations and alternate embodiments are contemplated, and can be made without departing from the spirit and scope of the appended claims.

I claim:

1. A system for delivering near on-demand digital information to a plurality of local subscribers, comprising:

a fragmentation unit that fragments a digital item into a sequence of N numbered fragments including lower and higher numbered fragments;

a sequencing processor that generates a sequencing pattern in which the fragments are scheduled with periods that are equal to the fragment number for the lower numbered fragments and that are at most the fragment number for the remaining higher numbered fragments;

a server that sequences the fragments into a multi-channel data stream in accordance with the sequencing pattern;

a digital transport system that continuously broadcasts the multi-channel data stream over M channels at successive time intervals to the local subscribers where M is at least the greatest integer of $$\sum_{r=1}^{N} \left( \frac{1}{r} \right);$$

and a plurality of local servers for extracting the fragments from the multi-channel data stream, seamlessly integrating the fragments and delivering them to a plurality of playback devices.

2. The system of claim 1, wherein said sequencing processor generates the sequencing pattern over said M channels by exploiting the fractal properties of the sequence of numbered fragments, said sequencing processor being programmed to:

a) assign successive prime numbers P1, P2, ... PM in a base set to the M channels, respectively, as root nodes;

b) bifurcate each of said M root nodes into a fractal tree in accordance with that channel's prime number, said fractal trees having branches that are expanded up to a maximum period N of the sequence equal to the number of fragments such that said fractal trees together enumerate each fragment from 1 to N, except the prime fragments and multiples of prime fragments that are omitted from the base set, said fractal trees providing a plurality of unused branches having periods less than said prime fragments and multiples thereof, respectively;

c) backfill the unused branches in said fractal trees with the prime and multiples of prime fragments which have periods greater than periods of the corresponding unused branches; and d) assign the fragments in said fractal trees to the designated channels with broadcast periods equal to periods of the corresponding branches in said fractal trees.

3. The system of claim 2 wherein the number of channels M is at most one plus the greatest integer of the natural log of N.

4. The system of claim 2, wherein said sequencing processor is programmed to bifurcate a jth channel, where j=1,2, ... M, into a jth fractal tree by:

a) splitting said root node into Pj branches that terminate at respective leaf nodes;

b) assigning successive prime numbers to the leaf nodes;
c) at each leaf node, spawning a subtree having branches that terminate at respective leaf nodes, in which the number of branches is equal to the leaf node's prime number, each leaf node having a period equal to the product of Pj and the prime numbers assigned to its parent leaf nodes; and
d) repeating steps b and c until the periods of the next leaf nodes would exceed the maximum period N.

5. The system of claim 4, wherein each of said leaf nodes is designated by an ordered set of pairs [(R1,B1) (R2,B2) . . . (Rq,Bq)] where R1, R2, . . . Rq are the prime numbers from the root node to the leaf node and B1, B2 . . . Bq, are the branch numbers traversed from the root node to the leaf node, said sequencing processor assigning the fragments corresponding to the respective leaf nodes to the channels with offsets given by:

$$\sum_{p=2}^{q} Bp \prod_{k=1}^{p-1} Rk + B1$$

where q is the number of leaf nodes traversed for each of said leaf nodes.

6. A system for delivering near on-demand digital information to a plurality of local subscribers, comprising:
   a fragmentation unit that fragments a digital item into a sequence of N numbered fragments including lower and higher numbered fragments;
   a sequencing processor that generates a sequencing pattern in which the fragments are scheduled with periods that are equal to the fragment number for the lower numbered fragments and that are at most the fragment number for the remaining higher numbered fragments;
   a server that sequences the fragments into a multi-channel data stream in accordance with the sequencing pattern;
   a digital transport system that continuously broadcasts the multi-channel data stream over M channels at successive time intervals to the local subscribers; and
   a plurality of local servers for extracting the fragments from the multi-channel data stream, seamlessly integrating the fragments and delivering them to a plural of playback devices, each said local server prestoring a percentage k of said digital item including its lower numbered fragments such that the number of channels M is at most the greatest integer of the natural log of the reciprocal of k.

7. The system of claim 6, wherein said sequencing processor generates the sequencing pattern over said M channels to exploit the fractal properties of the sequence of numbered fragments, said sequencing processor being programmed to:
   a) assign successive prime numbers P1, P2, PM in a base set to the M channels, respectively, as root nodes;
   b) bifurcate each of said M root nodes into a fractal tree in accordance with that channel's prime number, said fractal trees having branches that are expanded up to a maximum period N of the sequence equal to the number of fragments such that said fractal trees together enumerate each fragment from 1 to N, except the prime fragments and multiples of prime fragments that are omitted from the base set, said fractal trees providing a plurality of unused branches having periods less than said prime fragments and multiples thereof, respectively;
   c) remove those fragments from said fractal trees that are prestored in said local storages thereby creating additional unused branches;
   d) backfill the unused branches in said fractal trees with the prime and multiples of prime fragments which have periods greater than periods of the corresponding unused branches; and
   e) assign the fragments in said fractal trees to the M designated channels with broadcast periods equal to periods of the corresponding branches in said fractal trees.

8. The system of claim 7, wherein said sequencing processor is programmed to bifurcate a jth channel, where j=1,2, . . . M, into a jth fractal tree by:
   a) splitting said root node into Pj branches that terminate at respective leaf nodes;
   b) assigning successive prime numbers to the leaf nodes;
   c) at each leaf node, spawning a subtree having branches that terminate at respective leaf nodes, in which the number of branches is equal to the leaf node's prime number, each leaf node having a period equal to the product of Pj and the prime numbers assigned to its parent leaf nodes; and
   d) repeating steps b and c until the periods of the next leaf nodes would exceed the maximum period N.

9. The system of claim 8, wherein each of said leaf nodes is designated by an ordered set of pairs [(R1,B1) (R2,B2) . . . (Rq,Bq)] where R1, R2, . . . Rq are the prime numbers from the root node to the leaf node and B1, B2 . . . Bq, are the branch numbers traversed from the root node to the leaf node, said sequencing processor assigning the fragments corresponding to the respective leaf nodes to the channels with an offset given by:

$$\sum_{p=2}^{q} Bp \prod_{k=1}^{p-1} Rk + B1$$

where q is the number of leaf nodes traversed for each of said leaf nodes.

10. A system for delivering near on-demand digital information to a plurality of local subscribers, comprising:
   a fragmentation unit that fragments a digital item into a sequence of N numbered fragments including lower and higher numbered fragments;
   a sequencing processor that generates a sequencing pattern in which the fragments are scheduled with periods that are equal to the fragment number for the lower numbered fragments and that are at most the fragment number for the remaining higher numbered fragments;
   a server that sequences the fragments into a multi-channel data stream in accordance with the sequencing pattern;
   a digital transport system that continuously broadcasts the data stream over a plurality of channels at successive time intervals to the local subscribers; and
   a plurality of local servers for extracting the fragments from the multi-channel data stream, seamlessly integrating the fragments and delivering them to a plurality of playback devices, wherein the fragments are broadcast at their assigned periods with respective offsets, a number L of said fragments being prestored in the local servers,
   said sequencing processor generating the sequencing pattern over said channels by exploiting the fractal properties of the sequence of numbered fragments, said sequencing processor being programmed to:
   a) initialize a control variable equal to L+1 to indicate a current fragment for sequencing;
   b) initialize a plurality of fractal trees equal to the number of channels where the fractal trees have root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, said leaf nodes having broadcast periods equal to the product of the prime numbers assigned to the leaf nodes traversed from the root node to the particular leaf node;

c) select one of the fractal trees and one of its unassigned leaf nodes as a function of the unassigned leaf nodes' broadcast periods:

d) compute an expansion factor, which is the largest integer which when multiplied by the period of the selected leaf node is less than or equal to the value of control variable;

e) If the expansion factor equals one, assign the current fragment to the selected leaf node, incrementing the control variable, and return to step c until all of the fragments are assigned;

f) If the expansion factor is greater than one, compute a prime factorization of the expansion factor to generate an ordered list of prime factors;

g) recursively spawn subtrees from the selected leaf node until the ordered list is exhausted, said subtrees including a plurality of leaf nodes equal to the respective prime factor, said selected leaf node being reset to a first leaf node in the successively spawned subtrees;

h) assign the current fragment to the current leaf node, incrementing the control variable, and returning to step c until all of the fragments are assigned;

i) compute each fragment's period as the product of the prime factors Ri associated with the leaf nodes traversed from the root node to the fragments' assigned leaf node;

j) compute each fragment's offset as a function of the branches Bi and prime factors Ri traversed from the root node to the fragment's leaf node; and k) assign the fragments to the designated channels in accordance with the fragments' periods and offsets.

11. The system of claim 10, wherein the sequencing processor is programmed to select the fractal tree and leaf node in step c by:

computing a match score for each of the unassigned leaf nodes, said match scores being equal to the difference between the value of the control variable and the largest integer multiple of the broadcast period that is smaller than the value of the control variable; and selecting the leaf node having the smallest match score, if two or more match score are equal, selecting the leaf node having the largest broadcast period.

12. The system of claim 10, wherein the computer is programmed to compute each fragment's offset in step j as follows:

$$\text{offset} = \sum_{p=2}^{q} Bp \prod_{k=1}^{p-1} Rk + B1$$

where q is the number of nodes traversed from the root node to the fragment's leaf node.

13. A system for generating a data stream that is capable of delivering near on-demand digital information to a plurality of local subscribers, comprising:

a fragmentation unit that fragments a digital item into a sequence of N numbered fragments including lower and higher numbered fragments;

a sequencing processor that generates a sequencing pattern in which the fragments are scheduled with periods that are equal to the fragment number for the lower numbered fragments and that are at most the fragment number for the remaining higher numbered fragments; and a server that sequences the fragments into a multi-channel data stream in accordance with the sequencing pattern wherein the number of said channels is M where M is at least the greatest integer of $$\sum_{r=1}^{N}\left(\frac{1}{r}\right).$$

14. The system of claim 13, wherein said sequencing processor generates the sequencing pattern over said M channels by exploiting the fractal properties of the sequence of numbered fragments, said sequencing processor being programmed to:

a) assign successive prime numbers P1, P2, . . . PM in a base set to the M channels, respectively, as root nodes;

b) bifurcate each of said M root nodes into a fractal tree in accordance with that channel's prime number, said fractal trees having branches that are expanded up to a maximum period N of the sequence equal to the number of fragments such that said fractal trees together enumerate each fragment from 1 to N, except the prime fragments and multiples of prime fragments that are omitted from the base set, said fractal trees providing a plurality of unused branches having periods less than said prime fragments and multiples thereof, respectively;

c) backfill the unused branches in said fractal trees with the prime and multiples of prime fragments which have periods greater than the periods of the corresponding unused branches; and d) assign the fragments in said fractal trees to the designated channels with periods equal to the periods of the associated branches.

15. The system of claim 14, wherein the number of channels M is at most one plus the greatest integer of the natural log of N.

16. The system of claim 14, wherein said sequencing processor is programmed to bifurcate a jth channel, where j=1,2, . . . M, into a jth fractal tree by:

a) splitting said root node into Pj branches that terminate at respective leaf nodes;

b) assigning successive prime numbers to the leaf nodes;

c) at each leaf node, spawning a subtree having branches that terminate at respective leaf nodes, in which the number of branches is equal to the leaf node's prime number, each leaf node having a period equal to the product of Pj and the prime numbers assigned to its parent leaf nodes; and d) repeating steps b and c until the periods of the next leaf nodes would exceed the maximum period N.

17. The system of claim 16, wherein each of said leaf nodes is designated by an ordered set of pairs [(R1,B1) (R2,B2) . . . (Rq,Bq)] where R1, R2, . . . Rq are the prime numbers from the root node to the leaf node and B1, B2, . . . Bq, are the branch numbers traversed from the root node to the leaf node, said sequencing processor assigning the fragments corresponding to the respective leaf nodes to the channels with an offset given by:

$$\sum_{p=2}^{q} Bp \prod_{k=1}^{p-1} Rk + B1$$

where q is the number of leaf nodes traversed for each of said leaf node.

18. A system for generating a data stream that is capable of delivering near on-demand digital information to a plurality of local subscribers, comprising:

a fragmentation unit that fragments a digital item into a sequence of N numbered fragments including lower and higher numbered fragments;

a sequencing processor that generates a sequencing pattern in which the fragments are scheduled with periods that are equal to the fragment number for the lower numbered fragments and that are at most the fragment number for the remaining higher numbered fragments; and a server that sequences the fragments into a multi-channel data stream in accordance with the sequencing pattern, where the fragments are broadcast at their assigned periods with respective offsets, said sequencing processor generating the sequencing pattern over said channels by exploiting the fractal properties of the sequence of numbered fragments, said sequencing processor:

a) initializing a control variable equal to L+1 to indicate a current fragment for sequencing;

b) initializing a plurality of fractal trees equal to the number of channels where the fractal trees have root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, said leaf nodes having broadcast periods equal to the product of the prime numbers assigned to the leaf nodes traversed from the root node to the particular leaf node;

c) selecting one of the fractal trees and one of its unassigned leaf nodes as a function of the unassigned leaf nodes' broadcast periods:

d) computing an expansion factor, which is the largest integer which when multiplied by the period of the selected leaf node is less than or equal to the value of control variable;

e) If the expansion factor equals one, assigning the current fragment to the selected leaf node, incrementing the control variable, and returning to step c until all of the fragments are assigned;

f) If the expansion factor is greater than one, computing a prime factorization of the expansion factor to generate an ordered list of prime factors;

g) recursively spawning subtrees from the selected leaf node until the ordered list is exhausted, said subtrees including a plurality of leaf nodes equal to the respective prime factor, said selected leaf node being reset to a first leaf node in the successively spawned subtrees;

h) assigning the current fragment to the current leaf node, incrementing the control variable, and returning to step c until all of the fragments are assigned;

i) computing each fragment's period as the product of the prime factors Ri associated with the leaf nodes traversed from the root of the first tree to that fragments' assigned leaf node; and j) computing each fragment's offset as a function of the branches Bi and prime factors Ri traversed from the root of the first tree to that fragment's leaf node.

19. The system of claim 18, wherein the sequencing processor selects the fractal tree and leaf node in step c by:

computing a match score for each of the unassigned leaf nodes, said match scores being equal to the difference between the value of the control variable and the largest integer multiple of the broadcast period that is smaller than the value of the control variable; and selecting the leaf node having the smallest match score, if two or more match scores are equal, selecting the leaf node having the largest broadcast period.

20. The system of claim 18, wherein the sequencing processor computes each fragment's offset in step j as follows:

$$\text{offset} = \sum_{p=2}^{q} Bp \prod_{k=1}^{p-1} Rk + B1$$

where q is the number of nodes traversed from the root node of the first tree to the fragment's leaf node.

21. A method for delivering near on-demand digital information to a plurality of local subscribers, comprising:

fragmenting a digital item into a sequence of N numbered fragments including lower and higher numbered fragments;

sequencing said fragments over M channels so that the fragments have periods that are equal to the fragment number for the lower numbered fragments and have periods that are at most the fragment number for the remaining higher numbered fragments, wherein said fragments are sequenced by:

a) selecting the number of channels M, where M is at least the greatest integer of $$\sum_{r=1}^{N} \left( \frac{1}{r} \right);$$

b) assigning successive prime numbers P1, P2, . . . PM in a base set to the M channels, respectively, as root nodes;

c) bifurcating each of said M root nodes into a fractal tree in accordance with that channel's prime number, said fractal trees having branches that are expanded up to a maximum period N of the sequence equal to the number of fragments such that said fractal trees together enumerate each fragment from 1 to N, except the prime fragments and multiples of prime fragments that are omitted from the base set, said fractal trees providing a plurality of unused branches having periods less than said prime fragments and multiples thereof, respectively;

d) backfilling the unused branches in said fractal trees with the prime and multiples of prime fragments which have periods greater than the periods of the corresponding unused branches; and e) assigning the fragments in said fractal trees to the designated channels with broadcast periods equal to periods of the corresponding branches in said fractal trees, continuously broadcasting the sequenced fragments over said M channels at successive time intervals to the local subscribers;

in response to a subscriber request, downloading the fragments into a local storage so that the first fragment is available within one time interval from the subscriber request and the succeeding numbered fragments are available within their respective periods; and reading each successive fragment from the local storage and integrating it with the preceding fragment to seamlessly deliver the requested digital item to the subscriber.

22. The method of claim 21, wherein the number of channels M is at most one plus the greatest integer of the natural log of N.

23. The method of claim 21, wherein said computer is programmed to bifurcate a jth channel, where j=1,2, . . . M, into a jth fractal tree by:
   a) splitting said root node into Pj branches that terminate at respective leaf nodes;
   b) assigning successive prime numbers to the leaf nodes;
   c) at each leaf node, spawning a subtree having branches that terminate at respective leaf nodes, in which the number of branches is equal to the leaf node's prime number, each leaf node having a period equal to the product of Pj and the prime numbers assigned to its parent leaf nodes; and
   d) repeating steps b and c until the periods of the next leaf nodes would exceed the maximum period N.

24. The method of claim 23, wherein each of said leaf nodes is designated by an ordered set of pairs [(R1,B1) (R2B2) . . . (Rq,Bq)] where R1, R2, . . . Rq are the prime numbers from the root node to the leaf node and B1, . . . Bq, are the branch numbers traversed from the root node to the leaf node, said fragments being assigned to the channels with an offset given by:

$$\sum_{p=2}^{q} Bp \prod_{k=1}^{p-1} Rk + B1$$

where q is the number of leaf nodes traversed for each of said leaf nodes.

25. A method for delivering near on-demand digital information to a plurality of local subscribers, comprising:
   fragmenting a digital item into a sequence of N numbered fragments including lower and higher numbered fragments;
   prestoring a percentage k of said digital item including its lower numbered fragments with each said local subscriber in respective local storages;
   sequencing said fragments over M channels so that the fragments have periods that are equal to the fragment number for the lower numbered fragments and have periods that are at most the fragment number for the remaining higher numbered fragments, wherein the number of channels M is at most the greatest integer of the natural log of the reciprocal of k, said fragments being sequenced by:
   a) assigning successive prime numbers P1, P2, . . . PM in a base set to the M channels, respectively, as root nodes;
   b) bifurcating each of said M root nodes into a fractal tree in accordance with that channel's prime number, said fractal trees having branches that are expanded up to a maximum period N of the sequence equal to the number of fragments such that said fractal trees together enumerate each fragment from 1 to N, except prime fragments and multiples of prime fragments that are omitted from the base set, said fractal trees providing a plurality of unused branches having periods less than the omitted prime fragments and multiples thereof, respectively;
   c) removing those fragments from said fractal trees that are prestored in said local storages thereby creating additional unused branches;
   d) backfilling the unused branches in said fractal trees with the prime and multiples of prime fragments which have periods greater than periods of the corresponding unused branches; and
   e) assigning the fragments in said fractal trees to the designated channels with broadcast periods equal to periods of the corresponding branches in said fractal trees, continuously broadcasting the sequenced fragments over said channels at successive time intervals to the local subscribers;

in response to a subscriber request, downloading the fragments into a local storage so that the first fragment is available within one time interval from the subscriber request and the succeeding numbered fragments are available within their respective periods; and reading each successive fragment from the local storage and integrating it with the preceding fragment to seamlessly deliver the requested digital item to the subscriber.

26. A method for delivering near on-demand digital information to a plurality of local subscribers, comprising:
   fragmenting a digital item into a sequence of N numbered fragments including lower and higher numbered fragments;
   prestoring a number L of said fragments with the local subscribers in respective local storages;
   sequencing said fragments over M channels so that the fragments have periods that are equal to the fragment number for the lower numbered fragments and have periods that are at most the fragment number for the remaining higher numbered fragments, said fragments being sequenced by:
   a) initializing a control variable equal to L+1 to indicate a current fragment for sequencing;
   b) initializing a plurality of fractal trees equal to the number of channels where the fractal trees have root nodes Pj in a base set that includes successive prime numbers up to the number of trees, said fractal trees being expanded by splitting its root node into Pj branches Bi, which terminate at unassigned leaf nodes having prime factors Ri for i=0 to Pj−1, said leaf nodes having broadcast periods equal to the product of the prime numbers assigned to the leaf nodes traversed from the root node to the particular leaf node;
   c) selecting one of the fractal trees and one of its unassigned leaf nodes as a function of the unassigned leaf nodes' broadcast periods:
   d) computing an expansion factor, which is the largest integer which when multiplied by the period of the selected leaf node is less than or equal to the value of control variable;
   e) If the expansion factor equals one, assigning the current fragment to the selected leaf node, incrementing the control variable, and returning to step c until all of the fragments are assigned;
   f) If the expansion factor is greater than one, computing a prime factorization of the expansion factor to generate an ordered list of prime factors;
   g) recursively spawning subtrees from the selected leaf node until the ordered list is exhausted, said subtrees including a plurality of leaf nodes equal to the respective prime factor, said selected leaf node being reset to a first leaf node in the successively spawned subtrees;

h) assigning the current fragment to the selected leaf node, incrementing the control variable, and returning to step c until all of the fragments are assigned;

i) computing each fragment's period as the product of the prime factors Ri associated with the leaf nodes traversed from the root of the first tree to that fragments' assigned leaf node; and j) computing each fragment's offset as a function of the branches Bi and prime factors Ri traversed from the root of the first tree to that fragment's leaf node, continuously broadcasting the sequenced fragments over said channels at successive time intervals with the fragments' respective offsets to the local subscribers;

in response to a subscriber request, downloading the fragments into a local storage so that the first fragment is available within one time interval from the subscriber request and the succeeding numbered fragments are available within their respective periods; and reading each successive fragment from the local storage and integrating it with the preceding fragment to seamlessly deliver the requested digital item to the subscriber.

27. The method of claim 26, wherein the fractal tree and leaf node are selected in step c by:

computing a match score for each of the unassigned leaf nodes, said match scores being equal to the difference between the value of the control variable and the largest integer multiple of the broadcast period that is smaller than the value of the control variable; and selecting the leaf node having the smallest match score, if two or more match scores are equal, selecting the leaf node having the largest broadcast period.

28. The method of claim 26, wherein each fragment's offset is computed in step j as follows:

$$\text{offset} = \sum_{p=2}^{q} Bp \sum_{k=1}^{p-1} Rk + B1$$

where q is the number of nodes traversed from the root node of the first tree to the fragment's leaf node.

29. A method for generating a multi-channel data stream for providing near on-demand access to digital items, comprising:

fragmenting a digital item into a sequence of N numbered fragments including lower and higher numbered fragments;

generating a sequencing pattern in which the fragments have periods that are equal to the fragment number for the lower numbered fragments and have periods that are at most the fragment number for the remaining higher numbered fragments, said sequencing pattern being generated by:

a) selecting a number of channels M;

b) assigning successive prime numbers P1, P2, . . . PM in a base set to the M channels, respectively, as root nodes;

c) bifurcating each of said M root nodes into a fractal tree in accordance with that channel's prime number, said fractal trees having branches that are expanded up to a maximum period N of the sequence equal to the number of fragments such that said fractal trees together enumerate each fragment from 1 to N, except the prime fragments and multiples of prime fragments that are omitted from the base set, said fractal trees providing a plurality of unused branches having periods less than said prime fragments and multiples thereof, respectively;

d) backfilling the unused branches in said fractal trees with the prime and multiples of prime fragments which have periods greater than periods of the corresponding unused branches; and e) assigning the fragments in said fractal trees to the designated channels with periods equal to periods of the corresponding branches in said fractal trees; and scheduling the fragments into an M channel data stream in accordance with the sequencing pattern.

30. The method of claim 29, wherein the number of channels M is at most one plus the greatest integer of the natural log of N.

31. The method of claim 29, wherein the number of said channels M is at least the greatest integer of $$\sum_{r=1}^{N} \left( \frac{1}{r} \right).$$

32. The method of claim 29, wherein a jth channel, where j=1,2, . . . M, is bifurcated into a jth fractal tree by:

a) splitting said root node into Pj branches that terminate at respective leaf nodes;

b) assigning successive prime numbers to the leaf nodes;

c) at each leaf node, spawning a subtree having branches that terminate at respective leaf nodes, in which the number of branches is equal to the leaf node's prime number, each leaf node having a period equal to the product of Pj and the prime numbers assigned to its parent leaf nodes; and d) repeating steps b and c up to the point that the periods of the next leaf nodes would maximum period N.

33. The method of claim 32, wherein each of said leaf nodes is designated by an ordered set of pairs [(R1,B1) (R2,B2) . . . (Rq,Bq)] where R1, R2 . . . Rq are the prime numbers from the root node to the leaf node and B1,B2 . . . Bq, are the branch numbers traversed from the root node to the leaf node, said fragments being assigned to the channels with an offset given by:

$$\sum_{p=2}^{q} Bp \prod_{k=1}^{p-1} Rk + B1.$$

where q is the number of leaf nodes traversed for each of said leaf nodes.

* * * * *